May 26, 1953            H. PIKAL            2,639,799
AUTOMATICALLY RELEASABLE CHUCK FOR CONVEYERS AND THE LIKE
Filed Feb. 1, 1950            2 Sheets-Sheet 1
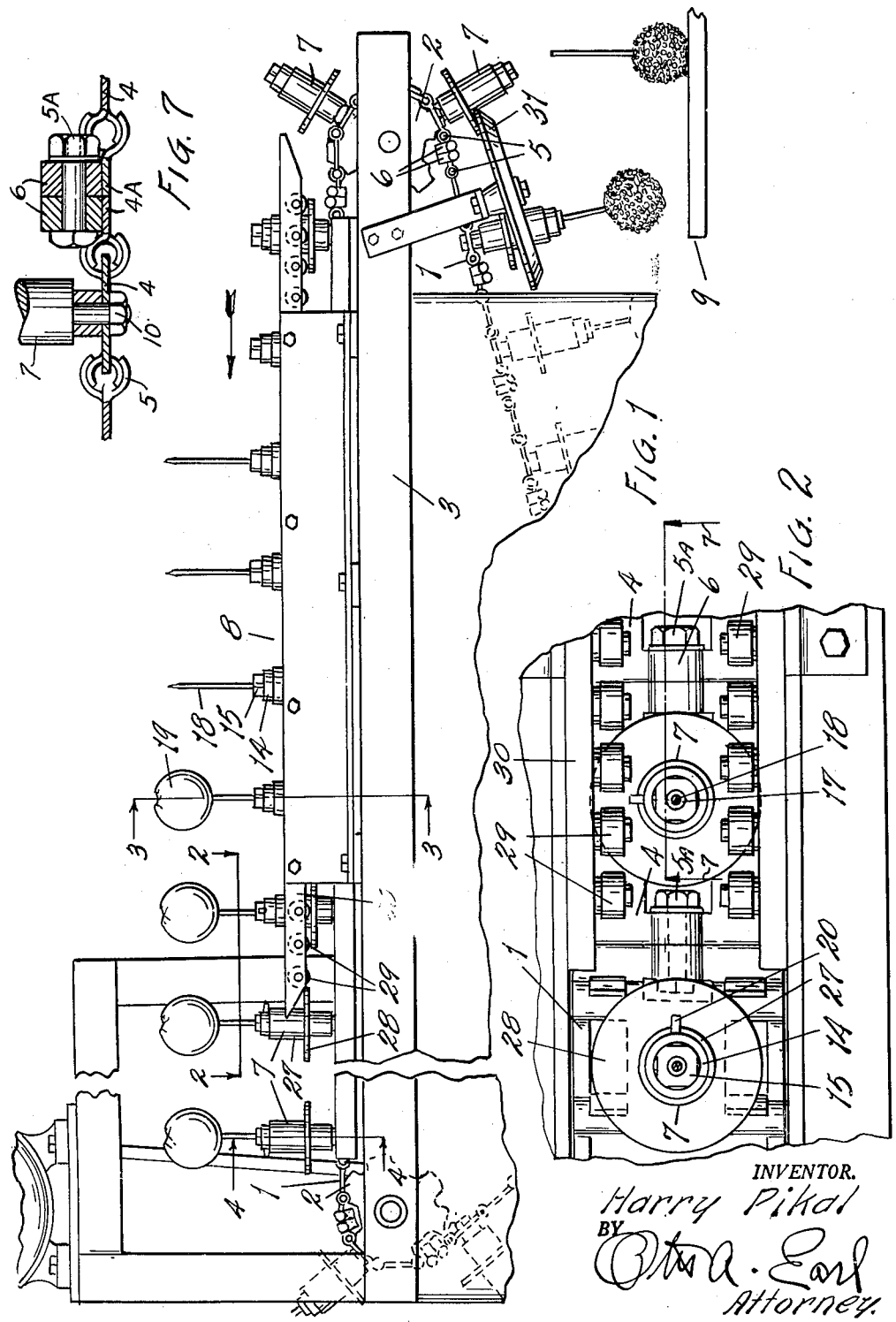
INVENTOR.
Harry Pikal
BY
Otra A. Earl
Attorney.

May 26, 1953 H. PIKAL 2,639,799
AUTOMATICALLY RELEASABLE CHUCK FOR CONVEYERS AND THE LIKE
Filed Feb. 1, 1950 2 Sheets-Sheet 2

INVENTOR.
Harry Pikal
BY
Otto R. Earl
Attorney.

Patented May 26, 1953

2,639,799

UNITED STATES PATENT OFFICE 2,639,799

AUTOMATICALLY RELEASABLE CHUCK FOR CONVEYERS AND THE LIKE

Harry Pikal, Bangor, Mich.

Application February 1, 1950, Serial No. 141,765

16 Claims. (Cl. 198—19)

This invention relates to improvements in an automatically releasable chuck for conveyers and the like.

The principal objects of this invention are:

First, to provide a chuck which may be rotatably mounted on a conveyer or other work advancing means and which may be automatically released by engagement with a fixed cam or actuating member positioned adjacent to the path of travel of the conveyer.

Second, to provide a chuck having a spring pressed closing action and an externally engageable releasing portion so that the chuck is adapted to be mounted on a movable work advancing member and automatically opened and closed by stops or cams positioned along the path of travel of the chuck to engage the projection on the chuck at predetermined positions.

Third, to provide a chuck adapted to be tiltably mounted on a work advancing member and rotatable about its chucking axis in either erect or tilted position.

Fourth, to provide work holding and advancing structure for receiving a work piece and advancing the piece through a series of stations and automatically releasing the work when it is in an inverted position so that the work falls by gravity from the advancing means.

Other objects and advantages relating to details of my chuck and work advancing means will be apparent from a consideration of the following description and claims and the attached drawings. The drawings, of which there are two sheets, illustrate two practical embodiments of my invention.

The subject matter of this invention has been divided from my copending application for Coating Machine for Apples and the like, Serial No. 44,553, filed August 16, 1948 and now abandoned.

Fig. 1 is a fragmentary side elevational view of an apple coating machine having a work advancing conveyer having a series of automatically releasable chucks mounted therealong.

Fig. 2 is a fragmentary plan view of the conveyer taken along the plane of the line 2—2 in Fig. 1 and illustrating two of the chucks thereon.

Fig. 7 is a fragmentary vertical longitudinal cross sectional view through the conveyer taken along the plane of line 7—7 in Fig. 2.

Figures 3, 4:
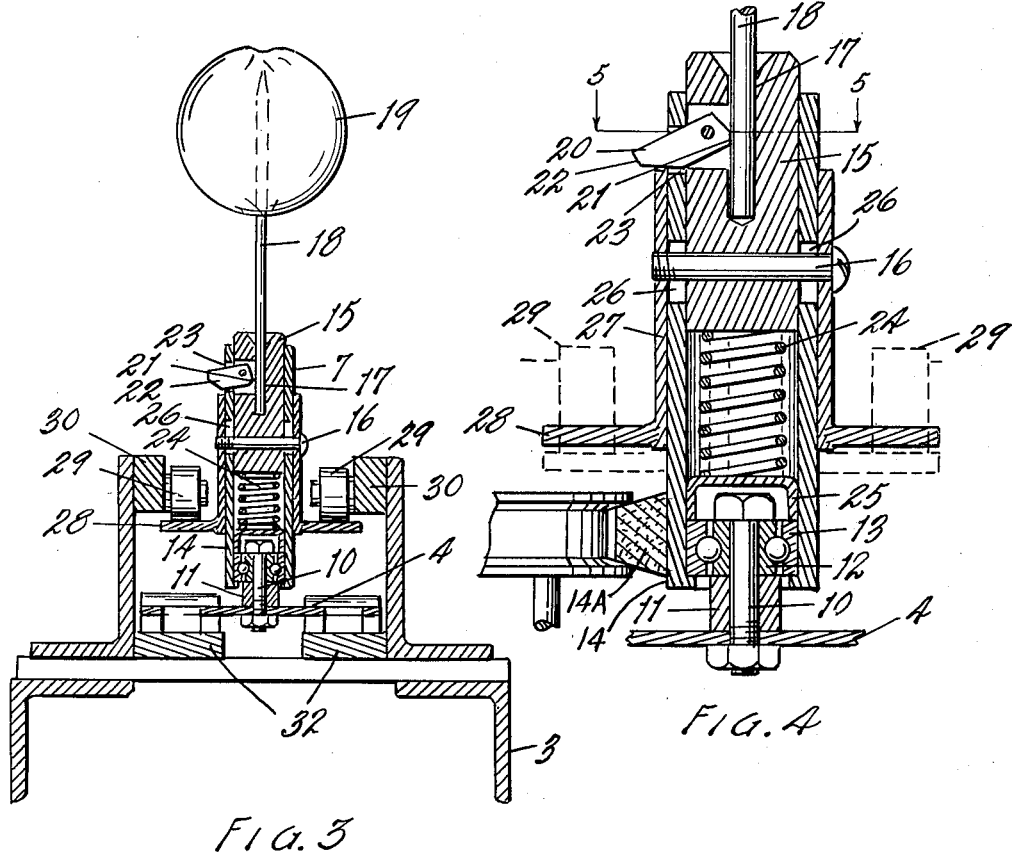
Fig. 3 is a fragmentary transverse vertical cross sectional view taken along the plane of the line 3—3 in Fig. 1 and showing the chuck in open work receiving position.
Fig. 4 is a fragmentary vertical cross sectional view through one of the chucks taken along the plane of the line 4—4 in Figs. 1 and 5 and illustrating the chuck in closed work holding position.

In Fig. 1 I have illustrated a link belt conveyer 1 trained over the sprockets 2. The sprockets 2 are mounted in a suitable framework 3 forming part of an apple coating machine as described in my above mentioned copending application. Part of the links 4 of the conveyer are connected by transverse pivots 5 permitting bending of the conveyer around the sprockets while others 4A of the links are connected by the longitudinally extending bolts 5A received in the bosses 6, thus forming longitudinally extending pivoted connections which permit portions of the conveyer to twist about the axis of the conveyer. Fig. 7 illustrates the manner in which the longitudinally extending pivot bolts are mounted in the conveyer. Spaced along the conveyer and secured to selected links thereof are a plurality of work receiving and holding chucks generally indicated at 7. The conveyer is arranged to move the chucks through a loading station indicated at 8 in Fig. 1 and thence through other work stations not important to this application to a work releasing station indicated generally at 9.

The construction of the chucks and their attachment to the conveyer is more particularly illustrated in Figs. 2 to 5. Each link 4 to which a chuck is attached is provided with an aperture receiving the chuck mounting bolt 10. The bolt 10 extends through a spacer sleeve 11 and the center race 12 of a ball bearing to secure the bearing to the link. The outer race 13 of the ball bearing is press fitted or otherwise non-rotatably connected to the inner end of a generally cylindrical member 14. A generally cylindrical chuck body 15 is slidably received in the outer end of the cylinder 14 but is held against rotation with respect thereto by the pin 16. The outer end of the body 15 has the work receiving recess 17 formed therein which, in the present instance, is of such a size and shape as to receive the sticks 18 of apples 19 to be coated.

The chuck body 15 carries the pivoted jaw 20 having an interior nose 21 swingable into gripping engagement with the stick and an exteriorly projecting portion 22 which projects from the body through an aperture 23 provided therefor in the cylinder 14. The body 15 is constantly urged outwardly of the cylinder by the coil spring 24 which abuts against the cap 25 positioned within the sleeve and over the head of the bolt 10. Outward movement of the body in the cylinder is limited by engagement of the pin 16 with the outer edges of slots 26 cut in the sides of the cylinder. As is most clearly illustrated in Fig. 4, the spring 24 will urge the body outwardly of the cylinder until the upper edge of the opening 23 in the cylinder engages the projecting portion 22 of the jaw to swing the jaw into gripping engagement with the work.

Retraction or inward movement of the body in the cylinder is effected by means of a sleeve 27 slidably positioned around the cylinder and connected to the body by the ends of the pin 16 which project through the slots 26. The inner end of the sleeve 27 carries an annular collar 28 which projects outwardly from the sleeve and is adapted to be engaged by the sets of rollers 29 carried on the rails 30 along each side of the loading station 8. The collars 28 are further adapted to be engaged and pressed inwardly by rotary disks 31 positioned in converging relationship to the conveyer at each side of the releasing station 9. When either the disks 31 or rollers 29 engage the collars, the sleeves 27 are drawn inwardly of the cylinder and the body 15 is also drawn inwardly due to its connection to the sleeve. The projecting portion 22 of the jaw 20 is therefore drawn against the lower edge of the aperture 23 in the cylinder causing the jaw to swing to releasing position, as is most clearly illustrated in Fig. 3. During the time that the sleeve and body are pressed inwardly, the links of the conveyer may be supported by tracks 32 mounted beneath the rails 30. When the chucks are in erect position at the loading station 8, the sticks 18 can be easily dropped into the work recesses 17, and when the chucks are in the inverted position as at the unloading station 9, the sticks and apples carried thereby will fall by gravity from the chucks when they are opened by the disks 31. In all positions of the chuck, it is rotatable on the bearing 12—13 by engagement with wheels or belts positioned along the path of the conveyer to frictionally engage the inner end of the cylinder 14. Fig. 4 illustrates the manner in which a driving belt 14A can be made to drivingly engage the rotatable chucks. The belt 14A can be positioned alongside the path of the conveyor at any desired position.

Figures 5, 6:
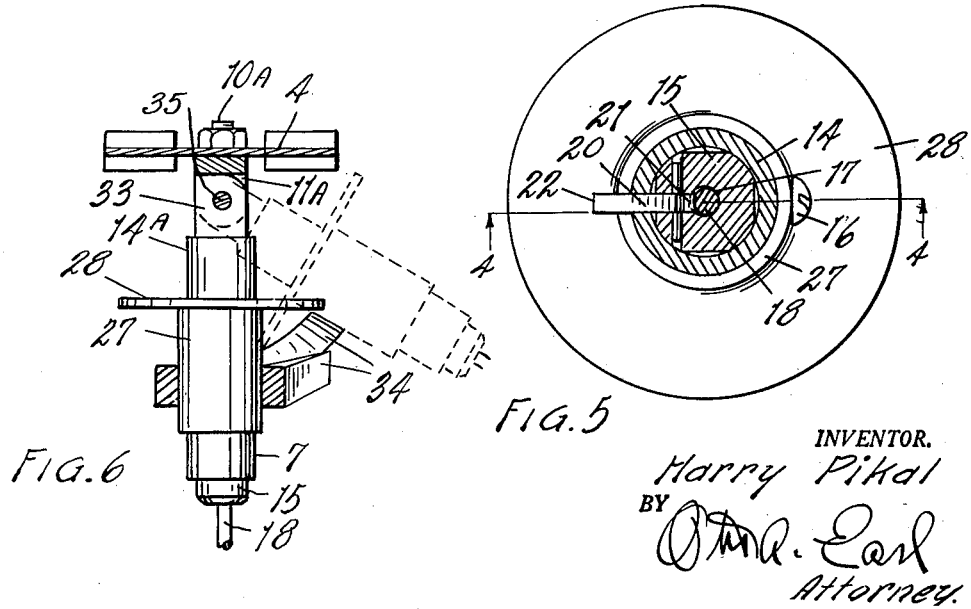
Fig. 5 is a horizontal cross sectional view through the chuck illustrating the action of the jaw thereof and taken along the plane of the line 5—5 in Fig. 4.
Fig. 6 is a fragmentary transverse cross sectional view through a conveyer having a modified form of connection to the chucks thereon.

The modified form of mounting illustrated in Fig. 6 shows the bolt 10A as securing a bifurcated support 11A to the link of the conveyer. The support 11A pivotally receives the tongue 33 of an inner bearing member positioned within the inner end of the sleeve 14A. A bolt or pin 35 extending between the sides of the bifurcated support passes through the ear 33 to form the pivotal connection. It will be noted that the pin 35 extends longitudinally of the conveyer so that the chuck may swing transversely of the conveyer axis. In other respects, the chuck shown in Fig. 6 is the same as the chuck shown in Figs. 1 to 5 and is rotatable about the inner bearing in much the same manner as the cylinder 14 rotates about the bearing 12—13. The modified form of chuck carries a sleeve 27 and retracting collar 28 identical with the first form of the chuck and is opened and closed in the same fashion. By providing the pivoted connection between the bifurcated support 11A and the inner bearing member, the chuck can be tilted relative to the conveyer by engagement with guide rails 34 to swing the chuck and the work piece laterally without twisting the conveyer 1A.

I have thus described two highly practical embodiments of my rotatable and tiltable chuck and means for mounting the chuck on a conveyer for automatic opening and closing motion. Other modifications may be made to adapt the chuck and conveyer to specialized types of work, and I do not limit my invention to the two particular forms illustrated.

Having thus described my invention, what I claim as new and desire to secure by Letters Patent is:

1. A conveyer for advancing objects mounted on sticks comprising, a series of links, part of said links having transverse pivotal connections whereby said conveyer may be trained over pulleys, others of said links having longitudinally extending pivotal connections whereby reaches of said conveyer may be twisted about its longitudinal axis, pins extending outwardly from part of said links, chucks carried by said pins and rotatable about the axes thereof, spring actuated jaws in said chucks adapted to grip sticks located therein, and jaw releasing members carried by said chucks and engageable from the outside of said chucks to release said jaws.

2. A conveyer for advancing objects mounted on sticks comprising, a series of links having transverse pivotal connections whereby said conveyer may be trained over pulleys, pins extending outwardly from part of said links, chucks carried by said pins and rotatable about the chucking axes of the chucks, said chucks being tiltable on said pins about axes parallel to the axis of said conveyer, spring actuated jaws in said chucks adapted to grip sticks located therein, and jaw releasing members carried by said chucks and engageable from the outside of said chucks to release said jaws.

3. A chuck adapted to hold apple sticks on a bolt of a conveyer having a series of bolts projecting outwardly therefrom comprising, a bearing rotatable on said bolt and spaced from said conveyer, a cylinder secured at its inner end to said bearing and rotatable about the axis of said bolt, a block in said cylinder and defining a stick receiving recess in its outer end, said block having limited axial motion in said cylinder, a jaw member pivoted in one side of said block and swingable into locking engagement with a stick in said recess, said cylinder defining an opening through which the outer end of said jaw projects, a spring urging said block outwardly of said cylinder whereby the edge of said opening engages said jaw to swing said jaw to gripping position, a sleeve around said cylinder and secured to said block by a pin extending through slots in said cylinder, and an annular flange on said sleeve adapted to be engaged by retracting elements adjacent to said conveyer to retract said sleeve and block and release said jaw.

4. A chuck adapted to hold apple sticks on a connector of a conveyer having a series of such connectors projecting outwardly therefrom comprising, a bearing rotatable on said connector, a cylinder secured at its inner end to said bearing and rotatable about the axis of said connector, a block in said cylinder and defining a stick receiving recess in its outer end, said block having limited axial motion in said cylinder, a jaw member pivoted in one side of said block and swingable into locking engagement with a stick in said recess, said cylinder defining an opening through which the outer end of said jaw projects, a spring urging said block outwardly of said cylinder whereby the edge of said opening engages said jaw to swing said jaw to gripping position, and a sleeve around said cylinder and secured to said block, said sleeve being adapted to be moved by a retracting element adjacent to said conveyer to retract said sleeve and block and release said jaw.

5. A chuck adapted to hold apple sticks on a connector of a work advancing structure having a series of such connectors projecting therefrom comprising, a cylinder rotatably mounted on said connector, a block in said cylinder and defining a stick receiving recess in its outer end, said block having limited axial motion in said cylinder, a jaw member pivoted in one side of said block and swingable into locking engagement with a stick in said recess, said cylinder defining an opening through which the outer end of said jaw projects, a spring urging said block outwardly of said cylinder whereby the edge of said opening engages said jaw to swing said jaw to gripping position, a sleeve around said cylinder and secured to said block, and a projection on said sleeve adapted to be engaged by a retracting element adjacent to the path of movement of said connector to retract said sleeve and block and release said jaw.

6. A chuck adapted to hold apple sticks on a work advancing means comprising, a bearing mounted on said means and tiltable transversely with respect to the path of travel of said means, a chuck block member rotatable on said bearing and having a stick receiving recess in its outer end, a locking jaw movably mounted on said block member and extending between said recess and the exterior of said block, a cylindrical member embracing said block and defining an opening through which the outer end of said jaw projects, a spring providing biasing force for axial movement between said cylindrical member and said block member whereby the edge of the opening in said cylindrical member will move said jaw into locking engagement with a stick in said recess, and means projecting from one of said members and adapted to be engaged by a retracting element adjacent to said work advancing means to produce relative axial motion between said members for releasing said jaw.

7. Work advancing and holding structure comprising, a conveyer mounted for movement in a closed circuit and being twistable along its reaches about its axis, supports secured to said conveyer at intervals therealong, bearings on said supports, chuck members rotatably carried by said bearings and having work receiving recesses formed in their outer ends, jaws on said chuck members movable into and out of work holding position in said recesses, actuating members rotatable with and being relatively slidable axially with respect to said chuck members, said actuating members having driving engagement with said jaws to lock and unlock said jaws, springs compressed between said chuck members and said actuating members to bias said members to jaw locking position, projections on part of said members engageable with fixed means to move said members to jaw unlocking position as said members are translated along said fixed means, and a guide rail positioned along one reach of said conveyer and across the path of said members to engage said members and swing them from their free position relative to said conveyer by twisting said conveyer.

8. A machine for translating sticks bodily through a plurality of work stations and for rotating said sticks about their axes at one of said stations, comprising, a conveyer mounted to move in a closed circuit past said stations, supports secured to said conveyor at intervals therealong, bearings mounted on said supports, said conveyer being twistable about its axis to tilt said bearings laterally with respect to the path of movement thereof, chuck structures rotatably carried on said bearings and having work receiving recesses in their outer ends, work gripping means associated with said chuck structures and movable transversely in said recesses in a work gripping and releasing motion, actuating means carried by said chuck structures and being relatively movable longitudinally with respect thereto, said actuating means having driving engagement with said gripping means to actuate said gripping means, yieldable means engaged between said gripping means and said actuating means to bias the means to work gripping position, annular projections on said actuating means engageable with retracting elements positioned adjacent to the path of movement of said chuck structures to move said actuating means to work releasing position as said structures are translated along said retracting elements, said chuck structures having a circular exterior surface coaxial with said bearing adapted to be engaged by a driving element at said one working station for rotating said chuck structures, and a guide rail extending across and along part of the path of movement of said chuck structures to engage and swing the same laterally from the path of said conveyer by twisting said conveyer.

9. A machine for translating sticks bodily through a plurality of work stations, comprising, a conveyer mounted to move in a closed circuit past said stations, supports secured to said carrier at intervals therealong, bearings mounted on said supports, said conveyer being twistable about its axis to tilt said bearings laterally with respect to the path of movement thereof, chuck structures rotatably carried on said bearings and having work receiving recesses in their outer ends, work gripping means associated with said chuck structures and movable transversely in said recesses in a work gripping and releasing motion, actuating means carried by said chuck structures and being relatively movable longitudinally with respect thereto, said actuating means having driving engagement with said gripping means to actuate said gripping means, annular projections on said actuating means engageable with retracting elements positioned adjacent to the path of movement of said chuck structures to move said actuating means to work releasing position as said structures are translated along said retracting elements, and a guide rail extending across and along part of the path of movement of said chuck structures to engage and swing the same laterally from the path of said conveyer by twisting said conveyer.

10. A machine for translating sticks bodily through a plurality of work stations, comprising, a carrier mounted to move in a closed circuit past said stations, supports secured to said carrier at intervals therealong, bearings mounted on said supports, chuck structures rotatably carried on said bearings and having work receiving recesses in their outer ends, said chuck structures and bearings being tiltable laterally of the path of movement of said carrier, work gripping means associated with said chuck structures and movable transversely in said recesses in a work gripping and releasing motion, actuating means carried by said chuck structures, said actuating means having driving engagement with said gripping means to actuate said gripping means, and annular projections on said actuating means engageable with retracting elements positioned adjacent to the path of movement of said chuck structures to move said actuating means to work releasing position as said structures are translated along said retracting elements.

11. A machine for translating sticks bodily through a plurality of work stations and for rotating said sticks about their axes at one of said stations, comprising, a carrier mounted to move in a closed circuit past said stations, supports secured to said carrier at intervals therealong, bearings tiltably mounted on said supports, chuck structures rotatably carried on said bearings and having work receiving recesses in their outer ends, work gripping means associated with said chuck structures and movable transversely in said recesses in a work gripping and releasing motion, actuating means carried by said chuck structures and being relatively movable longitudinally with respect thereto, said actuating means having driving engagement with said gripping means to actuate said gripping means, yieldable means engaged between said chuck structures and said actuating means to bias the actuating means to work gripping position, and annular projections on said actuating means engageable with retracting elements positioned adjacent to the path of movement of said chuck structures to move said actuating means to work releasing position as said structures are translated along said retracting elements, said chuck structures having a circular exterior surface coaxial with said bearing adapted to be engaged by a driving element at said one working station for rotating said chuck structures.

12. A machine for translating sticks bodily through a plurality of work stations, comprising, a carrier mounted to move in a closed circuit past said stations, supports secured to said carrier at intervals therealong, bearings tiltably mounted on said supports, chuck structures rotatably carried on said bearings and having work receiving recesses in their outer ends, work gripping means associated with said chuck structures and movable transversely in said recesses in a work gripping and releasing motion, actuating means carried by said chuck structures and movable longitudinally with respect thereto, said actuating means having driving engagement with said gripping means to actuate said gripping means, and annular projections on said actuating means engageable with retracting elements positioned adjacent to the path of movement of said chuck structures to move said actuating means to work releasing position as said structures are translated along said retracting elements.

13. In a machine for advancing sticks bodily through a number of working stations and for rotating said sticks about their axes at one of said stations, the combination of a carrier mounted to move in a closed circuit past said stations, a plurality of chuck structures connected to said carrier at intervals therealong, said structures being rotatable about their chucking axes and tiltable laterally of the path of movement of said carrier, said chuck structures including stick gripping means yieldably biased to stick gripping position, and projections on said chuck structures adapted to be engaged by fixed means located adjacent the path of travel of said structures, said projections being operatively connected to the gripping means of said chuck structures to move said means to work releasing position, said chuck structures having circular exterior surfaces coaxial with the axis of rotation of the structures and adapted to be engaged by driving means positioned at said one working station.

14. In a machine for advancing sticks bodily through a number of working stations, the combination of a carrier mounted to move in a closed circuit past said stations, a plurality of chuck structures connected to said carrier at intervals therealong, said structures being rotatable about their chucking axes and tiltable laterally of the path of movement of said carrier, said chuck structures including stick gripping means yieldably biased to stick gripping position, and projections on said chuck structures adapted to be engaged by fixed means located adjacent the path of travel of said structures, said projections being operatively connected to the gripping means of said chuck structures to move said means to work releasing position.

15. In a machine for advancing sticks bodily and rotatably through a number of working stations, the combination of a carrier mounted to move in a closed circuit past said stations, a plurality of chuck structures rotatably and laterally tiltably connected to said carrier at intervals therealong, said chuck structures including stick gripping means yieldably biased to stick gripping position, annular projections on said chuck structures adapted to be engaged by fixed means located adjacent the path of travel of said structures, said projections being operatively connected to the gripping means of said chuck structures to move said means to work releasing position, said chuck structures having circular exterior surfaces coaxial with the axis of rotation of the structures and adapted to be engaged by driving means positioned alongside the path of movement of said structures for rotating each chuck about its axis.

16. In a machine for advancing sticks bodily and rotatably through a number of working stations, the combination of a carrier mounted to move in a closed circuit past said stations, a plurality of chuck structures rotatably and laterally tiltably connected to said carrier at intervals therealong, said chuck structures including stick gripping means, annular projections on said chuck structures adapted to be engaged by fixed means located adjacent the path of travel of said structures, said projections being operatively connected to the gripping means of said chuck structures to move said means to work releasing position, said chuck structures having circular exterior surfaces coaxial with the axis of rotation of the structures and adapted to be engaged by driving means positioned at said one working station for rotating each chuck about its axis.

HARRY PIKAL.

References Cited in the file of this patent
UNITED STATES PATENTS

| Number | Name | Date |
|---|---|---|
| 81,260 | Daris | Aug. 18, 1868 |
| 1,333,006 | Welser | Mar. 9, 1920 |
| 1,645,600 | Kohler | Oct. 18, 1927 |
| 2,342,337 | Hallead | Feb. 22, 1944 |